(12) United States Patent
Tanaka et al.

(10) Patent No.: US 10,982,592 B2
(45) Date of Patent: Apr. 20, 2021

(54) ROTARY PISTON ENGINE

(71) Applicant: MAZDA MOTOR CORPORATION, Hiroshima (JP)

(72) Inventors: Kiyotaka Tanaka, Hiroshima (JP); Ryo Itonaka, Hiroshima (JP); Shinichiro Maeda, Hiroshima (JP); Shingo Karikawa, Hiroshima (JP); Hiromi Yoshioka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/440,372

(22) Filed: Jun. 13, 2019

(65) Prior Publication Data

US 2020/0025063 A1 Jan. 23, 2020

(30) Foreign Application Priority Data

Jul. 17, 2018 (JP) .............................. JP2018-134322

(51) Int. Cl.
| | |
|---|---|
| *F02B 53/12* | (2006.01) |
| *F02B 55/02* | (2006.01) |
| *F02B 55/08* | (2006.01) |
| *F02B 55/14* | (2006.01) |
| *F01C 21/08* | (2006.01) |
| *F02B 53/00* | (2006.01) |

(52) U.S. Cl.
CPC .............. *F02B 55/02* (2013.01); *F01C 21/08* (2013.01); *F02B 53/12* (2013.01); *F02B 55/08* (2013.01); *F02B 55/14* (2013.01); *F02B 2053/005* (2013.01); *F02B 2730/01* (2013.01)

(58) Field of Classification Search
CPC .. F01C 1/22; F01C 21/08; F02B 53/00; F02B 53/10; F02B 53/12; F02B 55/00; F02B 55/02; F02B 55/08; F02B 55/14; F02B 2053/005; F02B 2730/01; F04C 2250/20
See application file for complete search history.

(56) References Cited

U.S. PATENT DOCUMENTS

| | | | |
|---|---|---|---|
| 3,246,636 A | 4/1966 | Bentele | |
| 3,606,602 A * | 9/1971 | Hamada | ................... F02B 55/14 |
| | | | 418/61.2 |
| 3,696,796 A | 10/1972 | Gavrun | |

(Continued)

FOREIGN PATENT DOCUMENTS

| | | | |
|---|---|---|---|
| JP | 2013044301 A | * | 3/2013 |
| JP | 5672198 B2 | | 2/2015 |

(Continued)

*Primary Examiner* — Audrey K Bradley
(74) *Attorney, Agent, or Firm* — Studebaker & Brackett PC

(57) ABSTRACT

Each of recesses in outer circumferential surfaces of rotors includes: a leading-side area extending forward from a longitudinal center of an associated one of the outer circumferential surfaces in a rotation direction of the rotor, and a trailing-side area continuous with the leading-side area, and extending rearward from the longitudinal center in the rotation direction. From the longitudinal center of the associated one of the outer circumferential surfaces in the rotation direction, forward extension of the leading-side area is longer than rearward extension of the trailing-side area. The leading-side area has a larger volume than the trailing-side area.

2 Claims, 11 Drawing Sheets

(56) References Cited

U.S. PATENT DOCUMENTS

| | | | | |
|---|---|---|---|---|
| 3,996,900 A * | 12/1976 | Feierabend | ............ | F02B 53/12 |
| | | | | 123/210 |
| 4,024,842 A * | 5/1977 | Dumaine | ................ | F01C 21/08 |
| | | | | 123/218 |
| 4,083,329 A * | 4/1978 | Myers | .................... | F02B 53/10 |
| | | | | 123/205 |
| 4,085,712 A * | 4/1978 | Myers | .................... | F02B 53/10 |
| | | | | 123/205 |
| 5,343,838 A * | 9/1994 | Abraham | .................. | F01C 1/22 |
| | | | | 123/218 |
| 2014/0069273 A1* | 3/2014 | Biddulph | ................ | F16J 1/001 |
| | | | | 92/177 |
| 2017/0167368 A1 | 6/2017 | Richmond et al. | | |

FOREIGN PATENT DOCUMENTS

| | | |
|---|---|---|
| JP | 2015-078664 A | 4/2015 |
| WO | 2013/017232 A2 | 2/2013 |

\* cited by examiner

ROTARY PISTON ENGINE

CROSS-REFERENCE TO RELATED APPLICATION

This application claims priority to Japanese Patent Application No. 2018-134322 filed on Jul. 17, 2018, the entire disclosure of which is incorporated by reference herein.

BACKGROUND

The present disclosure relates to a rotary piston engine.

In a rotary piston engine, a combustion chamber is defined between a rotor housing with a trochoid inner circumferential surface and a rotor. A recess for defining the combustion chamber is formed in the outer circumferential surface of the rotor. With respect to the recess of such a rotor, Japanese Unexamined Patent Publication No. 2015-78664 describes a recess including a first recess and a second recess. The first recess is located on the trailing side in the rotation direction of a rotor. The second recess is located on the leading side and continuous with the first recess. The cross-sectional area of the first recess, which is orthogonal to the circumference of the rotor, is smaller than that of the second recess. This improves the combustion stability of the engine. Specifically, when air-fuel mixture flows from the trailing side to the leading side, generation of turbulence is facilitated at the connection between the first and second recesses, at which the cross-sectional area of the whole recess changes. This aims to promote mixture and diffusion of the air-fuel mixture.

A known problem in a rotary piston engine is that the combustion center of gravity retards at introduction of EGR gas, and the thermal efficiency decreases. As a solution, advancing of ignition timing and shortening of the period of ignition delay (i.e., the period from ignition to start of apparent heat generation) may be considered. However, a rotary piston engine has the following tendency due to the structure, unlike a reciprocating engine. More heat tends to be transferred from flame to the wall surface of the combustion chamber at an initial stage of combustion after ignition. It is thus difficult to exhibit robustness of ignition in advanced ignition, and to shorten the period of ignition delay.

SUMMARY

To address the problems, the present disclosure enables advanced ignition and a shorter period of ignition delay in a rotary piston engine to improve thermal efficiency with advanced combustion center of gravity.

In order to achieve the objective, according to the present disclosure, the position of the recess in the outer circumferential surface of a rotor is shifted to the leading side to increase the volume of a leading-side area relative to that of a trailing-side area.

A rotary piston engine disclosed herein includes: a rotor housing with a trochoid inner circumferential surface;

a substantially triangular rotor housed in the rotor housing chamber, having three outer circumferential surfaces that partition the rotor housing chamber into three operation chambers, having recesses, each being formed in one of the outer circumferential surfaces, and allowing the operation chambers to sequentially perform intake, compression, expansion and exhaust strokes while circumferentially moving the operation chambers by rotation; and a spark plug provided in the rotor housing.

Each of the recesses includes: a leading-side area extending forward from a longitudinal center of the associated one of the outer circumferential surfaces in a rotation direction of the rotor, and a trailing-side area continuous with the leading-side area, and extending rearward from the longitudinal center in the rotation direction.

From the longitudinal center in the rotation direction, forward extension of the leading-side area is longer than rearward extension of the trailing-side area. The leading-side area has a larger volume than the trailing-side area.

According to this configuration, the leading-side area extends longer from the longitudinal center, of the outer circumferential face of the rotor, in the rotation direction of the rotor. This allows a flame to grow in the leading-side area, while largely advancing ignition timing from a compression top dead center. In the growth of the flame in the leading-side area, since the leading-side area has a large volume, the heat transferred from the flame to wall surfaces due to the contact between the flame and the rotor, that is, a cooling loss decreases. This facilitates the growth of the flame at the initial stage of combustion. On the other hand, since the trailing-side area has a relatively small volume, a squish flow heading from the trailing side to the leading side occurs earlier and largely when the rotor further rotates after reaching the compression top dead center. This promotes the growth of the flame. Accordingly, even if the ignition timing largely advances from the compression top dead center, this configuration exhibits robustness of ignition and is advantageous in shortening the period of ignition delay. Therefore, at a request for EGR, the ignition timing easily advances with a proper combustion center of gravity, which is advantageous in improving the thermal efficiency.

In one embodiment, a distance between a distal end of the leading-side area in the rotation direction and a tip of the associated one of the outer circumferential surfaces in the rotation direction falls within a range from 5/100 to 15/100 of a length of the outer circumferential surface in the rotation direction. This allows for large advancing of the ignition timing from the compression top dead center when the flame grows in the leading-side area at the initial stage of combustion, which is advantageous in obtaining a proper combustion center of gravity.

In one embodiment, the leading-side area includes a recessed depth that is deepest at a center corresponding to an ignition point of the spark plug.

The depth is deeper than the trailing-side area, and has a concave surface curving with a depth gradually decreasing toward both sides of the associated one of the outer circumferential surfaces of the rotor and toward a front in the rotation direction.

This reduces the heat transferred from the flame occurring at the initial stage of combustion to wall surfaces, which is advantageous in promoting the growth of the flame.

A rotary piston engine according to an embodiment includes:

a rotor housing with a trochoid inner circumferential surface, the surface being in a substantially elliptical shape;

side housings, each being disposed on either side of the rotor housing along an axis of the rotor housing, and forming a rotor housing chamber together with the rotor housing;

a substantially triangular rotor housed in the rotor housing chamber, having three outer circumferential surfaces that partition the rotor housing chamber into three operation chambers, having recesses, each being formed in one of the outer circumferential surfaces, and allowing the operation chambers to sequentially perform intake, compression, expansion and exhaust strokes while circumferentially moving the operation chambers by rotation; and a spark plug provided in the rotor housing.

Each of the recesses includes: a leading-side area extending forward from a longitudinal center of an associated one of the outer circumferential surfaces in a rotation direction of the rotor, and a trailing-side area continuous with the leading-side area, and extending rearward from the longitudinal center in the rotation direction. Each of the recesses extends long in the rotation direction.

From the longitudinal center in the rotation direction, forward extension of the leading-side area is longer than rearward extension of the trailing-side area.

The leading-side area has a width gently increasing toward a front in the rotation direction of the rotor, and an arc-like distal end.

The trailing-side area is continuous with a narrowed proximal end of the leading-side area, extends, with a same width as the proximal end, rearward in the rotation direction of the rotor, and has a tapered distal end and a distal edge that extends linearly along a width of the rotor.

A distance between the distal end of the leading-side area in the rotation direction of the rotor and a tip of the outer circumferential surface in the rotation direction falls within a range from 5/100 to 15/100 of a length of the outer circumferential surface in the rotation direction.

The leading-side area has a larger volume than the trailing-side area.

DESCRIPTION OF EMBODIMENTS

An embodiment of the present disclosure will now be described with reference to the drawings. The following description of preferred embodiment is only an example in nature, and is not intended to limit the scope, applications or use of the present disclosure.

Overall Configuration of Rotary Piston Engine

Figure 1:
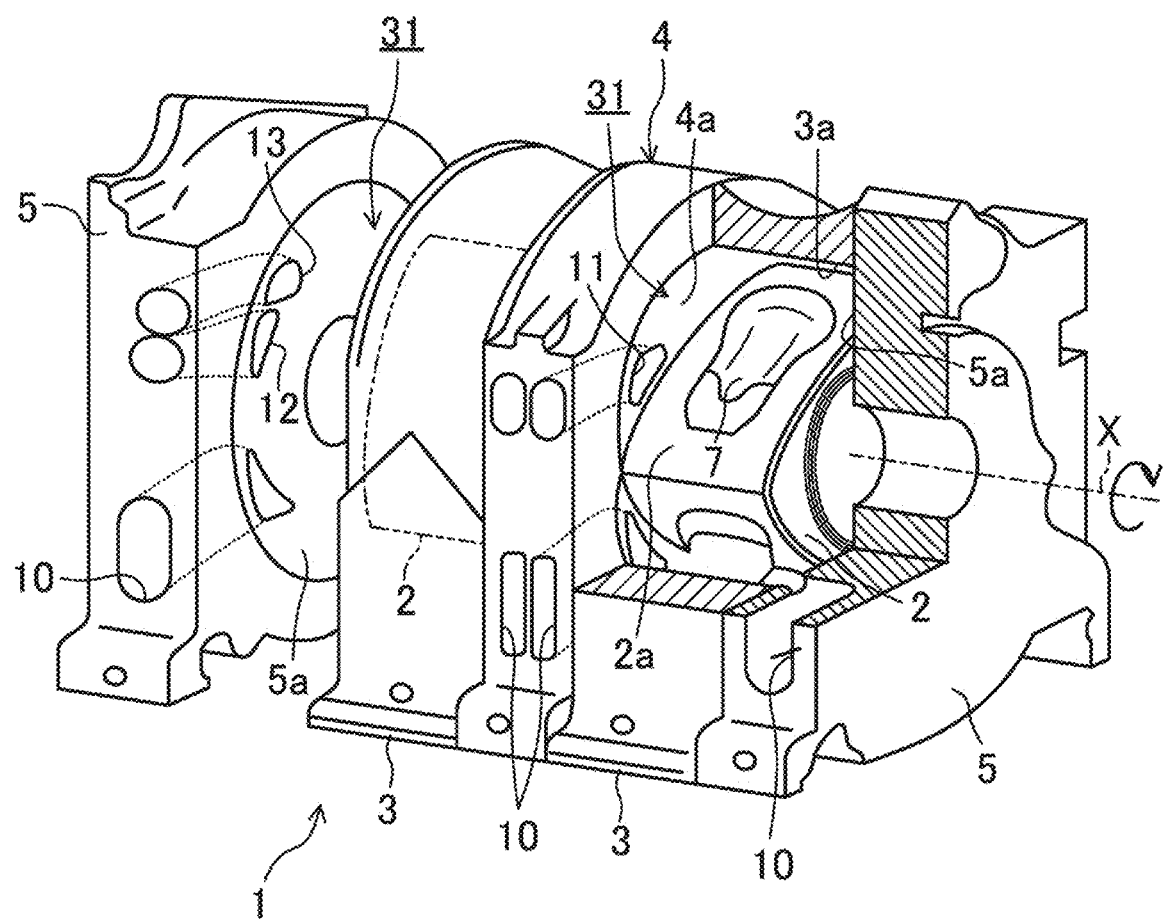
FIG. 1 is a perspective view illustrating an outline of a rotary piston engine according to an embodiment of the present disclosure.

A rotary piston engine 1 (hereinafter simply referred to as an engine 1) shown in FIG. 1 is mounted on a vehicle, and includes two rotors 2. An intermediate housing 4 is provided between two rotor housings 3, each of which houses one of the rotors 2. Side housings 5 are provided, each of which is located on the outer side of either one of the two rotor housings 3. Focusing on one rotor housing 3, the intermediate housing 4 may be positioned on one side of the rotor housing 3. Together with the rotor housing 3 and one of the side housings 5, the intermediate housing 4 may be regarded as a side housing forming one of rotor housing chambers 31.

In FIG. 1, the front (right in FIG. 1) of the engine 1 partially is cut out to show the inside of the engine, and the side housing 5 to the rear (left in FIG. 1) is shown separately to show the inside of the engine 1. Reference character X in the figure indicates the rotation axis of an eccentric shaft as an output shaft.

Figure 2:
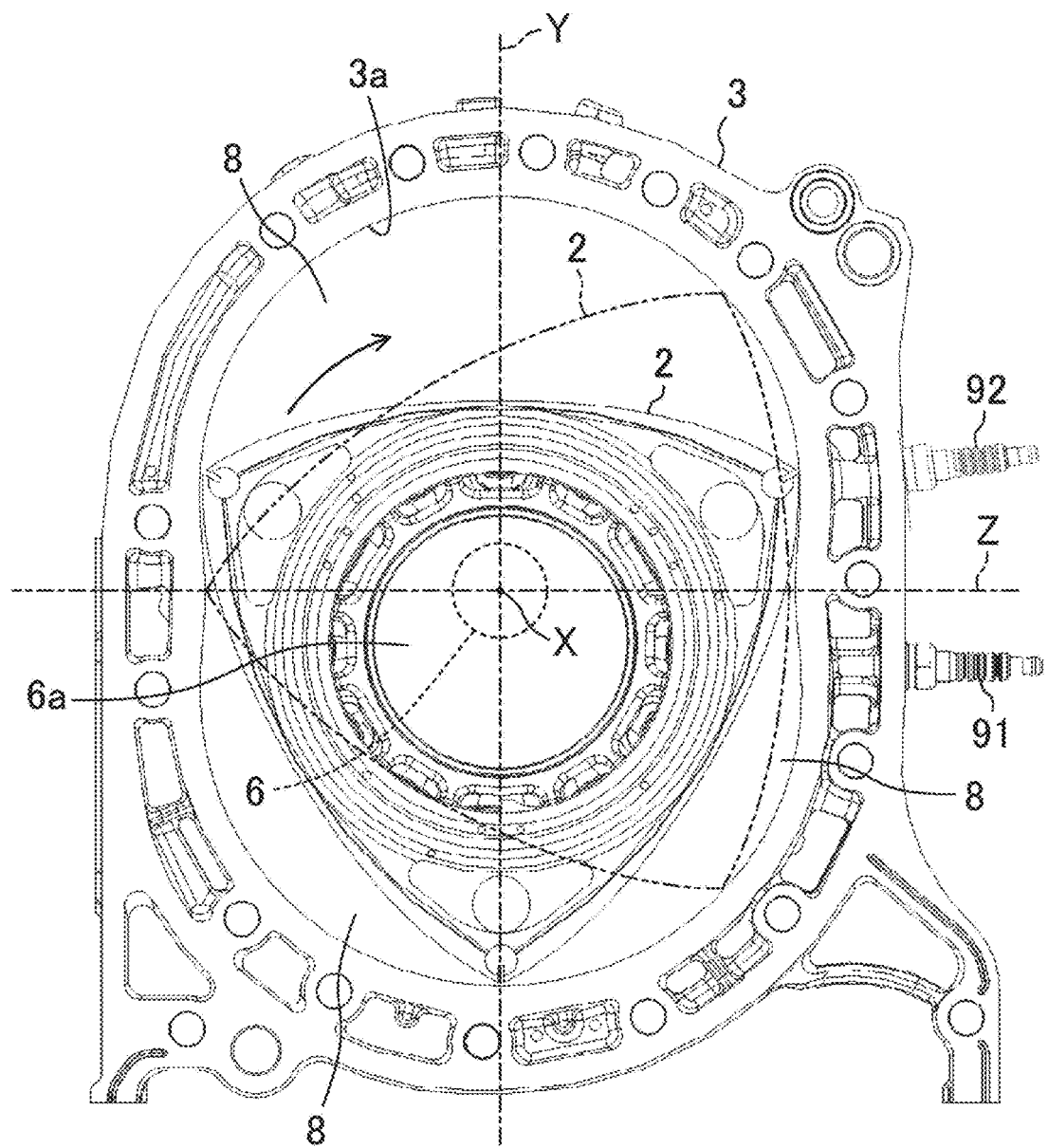
FIG. 2 is a front view illustrating a rotor and a rotor housing of the engine.

As shown in FIG. 2, each rotor housing 3 has a trochoid inner circumferential surface 3a in a substantially elliptical (oval) shape as viewed along the rotation axis X, which is drawn by a parallel trochoid curve. As shown in FIG. 1, the inner circumferential surface of each rotor housing 3, a side surface 4a on one side of the intermediate housing 4, and an inner side surface 5a of an associated one of the side housings 5 define one of the rotor housing chambers 31. This rotor housing chamber 31 houses one of the rotors 2. The two rotor housing chambers 31 on the sides of the intermediate housing 4 have the same configuration except that the respective rotors 2 rotate with different phases.

Each rotor 2 is in a substantially triangular shape with sides whose centers expand outside as viewed along the rotation axis X. Between each pair of apexes of the triangle, an outer circumferential surface 2a in a substantially rectangular shape is found, in which a recess 7 is formed. An apex seal 9 provided on each apex of the triangle of each rotor 2 comes into sliding contact with the trochoid inner peripheral surface 3a of the associated one of the rotor housings 3 in accordance with the rotation of the rotor 2. As shown in FIG. 2, the rotor 2 partitions the inside of the rotor housing chamber 31 into three operation chambers 8.

The rotor 2 is supported by an eccentric ring 6a of an eccentric shaft 6. While rotating, the rotor 2 revolves about the rotation axis X in the same direction as the rotation. The rotation of the rotor 2 includes these rotation and revolution in a broad sense. While the rotor 2 rotates once, the three operation chambers 8 move circumferentially to perform intake, compression, expansion (combustion), and exhaust strokes. The rotational force generated thereby is output from the eccentric shaft 6 via the rotor 2.

In FIG. 2, the rotor 2 rotates clockwise as indicated by the arrow. Assume that the rotor housing chamber 31 is divided into right and left by the longer axis Y of the rotor housing chamber 31, which passes through the rotation axis X. The left of the rotor housing chamber 31 substantially serves as a region for the intake and exhaust strokes. The right substantially serves as a region for the compression and expansion strokes.

As shown in FIG. 1, intake ports 11 to 13 and exhaust ports 10 are open in the positions corresponding to the regions for the intake and exhaust strokes on the side surfaces 4a of the intermediate housing 4 and the inner side surfaces 5a of the side housings 5. Although not shown in the figure, each of fuel injection valves for injecting fuel into the respective operation chambers 8 performing the intake or compression stroke is provided on the top of the associated one of the rotor housings 3.

As shown in FIG. 2, assume that the rotor housing 3 is divided into leading and trailing sides in the rotation direction of the rotor by the shorter axis Z of the rotor housing chamber 31, which passes through the rotation axis X. To the side of the rotor housing 3 on the leading side, a leading spark plug 91 (hereinafter referred to as an "L-side spark plug 91") is attached. To the side of the rotor housing 3 on the trailing side, a trailing spark plug 92 (hereinafter, referred to as a "T-side spark plug 92") is attached. The longer axis Y and the shorter axis Z are orthogonal to each other.

Although not shown in the figure, the rotary piston engine 1 includes an EGR system that returns part of exhaust gas to intake passages. The exhaust gas circulates in accordance with the operating state of the engine.

The rotary piston engine 1 includes a control unit as a controller for controlling the operation of the engine, including intake throttle valves, fuel injection valves, the spark plugs 91 and 92, and the EGR system.

<Control Unit>

The control unit includes a microcomputer as a base, a central processing unit (CPU), a memory, and a signal input/output (I/O) bus. The CPU executes programs. The memory may be, for example, a RAM or a ROM that stores the programs and data. The control unit receives signals of various information from an accelerator position sensor, a vehicle speed sensor, an engine rotation angle sensor, an air-fuel ratio sensor, an engine water temperature sensor, an air flow sensor, and other sensors of the vehicle.

The control unit determines the operating state of the engine 1 based on the received signals. In accordance with the operating state, the control unit controls the opening degrees of the throttle valves, the EGR rate of the EGR system, the ignition timings of the L- and T-side spark plugs 91 and 92, and the amounts and timings of fuel injection by the fuel injection valves in respective operation chambers 8.

Regarding the ignition timings, the ignition timing of the L-side spark plug 91 is more advanced than the ignition timing of the T-side spark plug 92 within a range from 15° to 55° before a compression top dead center (BTDC). Based on this setting, the times for conducting electricity to L- and T-side spark coils are controlled.

The ignition timing of the L-side spark plug 91 is controlled in accordance with the EGR ratio so that the combustion center of gravity is brought to an appropriate position with high thermal efficiency within a range from 10° to 30° after the compression top dead center ATDC. As indicated by the chain line in FIG. 2, when one of the apexes of the rotor 2 is positioned on the shorter axis Z on the opposite side of the spark plugs 91 and 92, the operation chamber located on the opposite side of the apex reaches a compression top dead center.

The higher the EGR ratio is, the longer the period of ignition delay is and the more the combustion center of gravity retards. To address the problem, the period of ignition delay as well as a target start time of (apparent) heat generation is set in accordance with the EGR ratio. Accordingly, the timing advancing from the target start time of heat generation by the period of ignition delay is regarded as the ignition timing of the L-side spark plug 91.

The ignition timing of the L-side spark plug 91 is corrected in accordance with the engine load (the opening degree of the throttle valve) and the engine speed. That is, the higher the engine load is, the more the ignition timing retards, while the higher the engine speed is, the more the ignition timing advances.

The ignition timing by the T-side spark plug 92 is controlled to retard from the ignition timing of the L-side spark plug 91 by a predetermined angle.

<Recess of Rotor>

Figure 3:
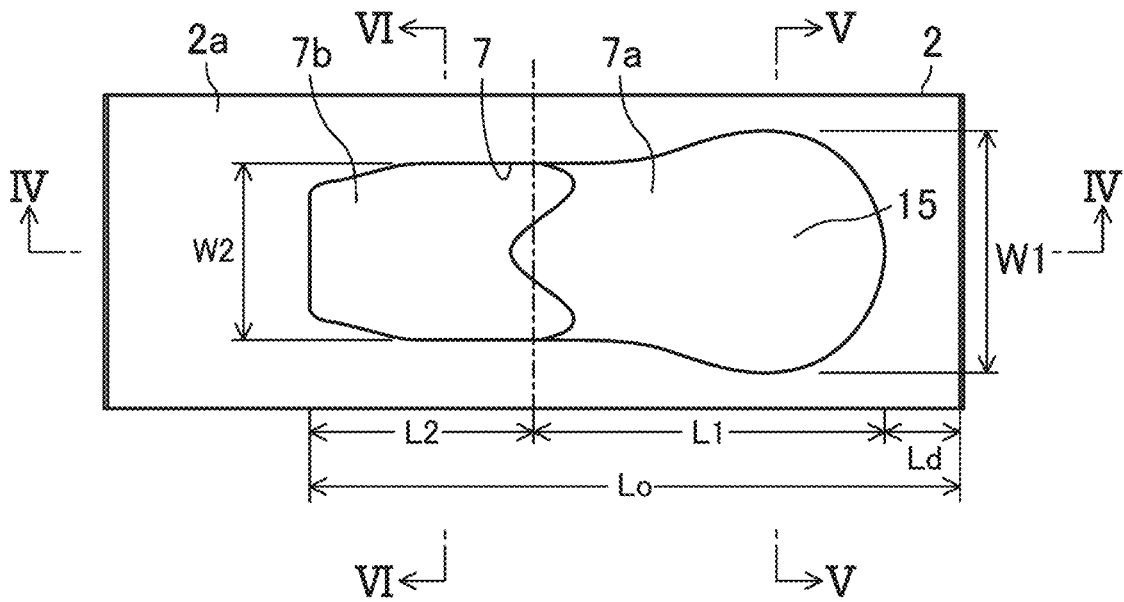
FIG. 3 is a plan view illustrating an outer circumferential surface of the rotor.

As shown in FIG. 3, the recess 7 formed in each of the outer circumferential surfaces 2a of the rotors 2 extends long in the rotation direction of the rotor 2. The recess 7 includes a leading-side area 7a (hereinafter referred to as an "L-side area 7a") and a trailing-side area 7b (hereinafter referred to as a "T-side area 7b"). The L-side area 7a extends forward from the longitudinal center of the outer circumferential surface 2a in the rotation direction of the rotor. The T-side area 7b is continuous to the L-side area 7a and extends rearward from the center of the outer circumferential surface 2a in the rotation direction of the rotor. The volume of the recess 7 is set such that each operation chamber 8 has a geometric compress ion ratio of 9.7 or greater.

In plan view of the outer circumferential surface 2a of the rotor 2, the L-side area 7a has a width gently increasing toward the front in the rotation direction of the rotor. The distal end of the L-side area 7a is in an arc shape. In other words, the L-side area 7a is in a shape expanding forward in the rotation direction of the rotor like a bulb. On the other hand, the T-side area 7b is continuous with the narrowed proximal end of the L-side area 7a, and extends, with the same width as the proximal end, rearward in the rotation direction of the rotor. The T-side area 7b has a tapered distal end, and a distal edge that extends linearly along the width of the rotor 2.

The L-side area 7a extends forward in the rotation direction of the rotor from the longitudinal center of the outer circumferential surface 2a. The T-side area 7b extends rearward in the rotation direction of the rotor from the longitudinal center of the outer circumferential face 2b. The L-side area 7a has a forward extension L1 longer than a rearward extension L2 of the T-side area 7b. A distance Ld between the distal end of the L-side area 7a in the rotation direction of the rotor and the tip of the outer circumferential surface of the L-side area 7a in the rotation direction falls within a range from 5/100 to 15/100 of a length Lo of the outer circumferential surface 2a in the rotation direction of the rotor. In one preferred embodiment, the Ld/Lo ratio falls within a range from 5/100 to 12/100 to exhibit a lower S/V ratio, which will be described later, than that in Comparative Example 1. In one more preferred embodiment, the Ld/Lo ratio falls within a range from 7/100 to 10/100 to obtain a low S/V ratio at 49° BTDC.

Figure 4:
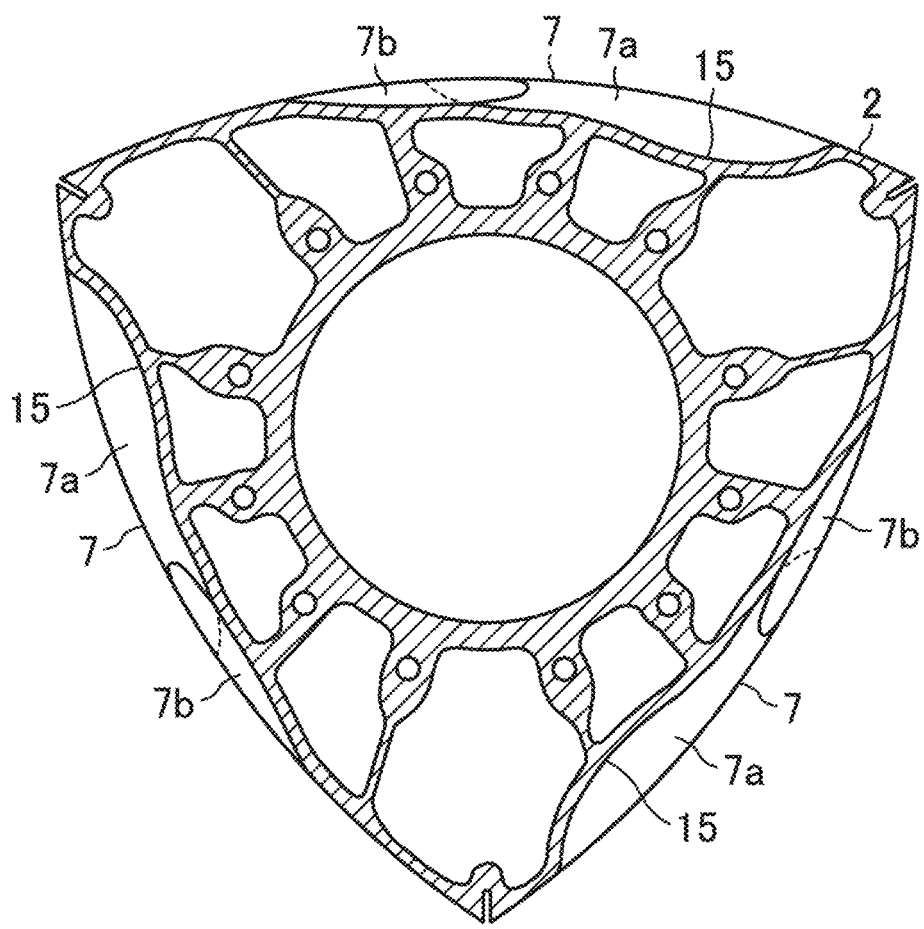
FIG. 4 is a cross-sectional view taken along line IV-IV of FIG. 3.
Figure 5:
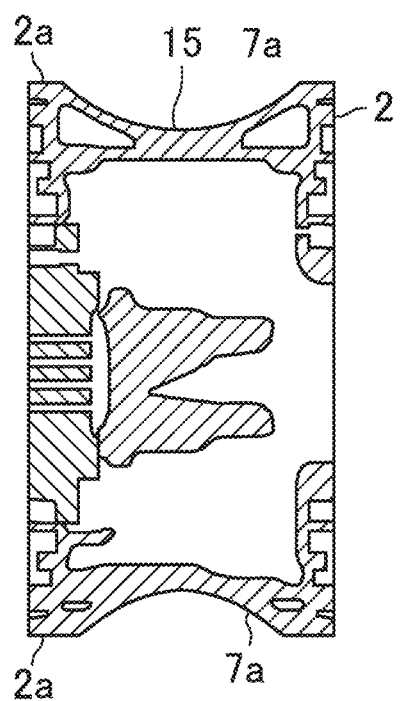
FIG. 5 is a cross-sectional view taken along line V-V of FIG. 3.
Figure 6:
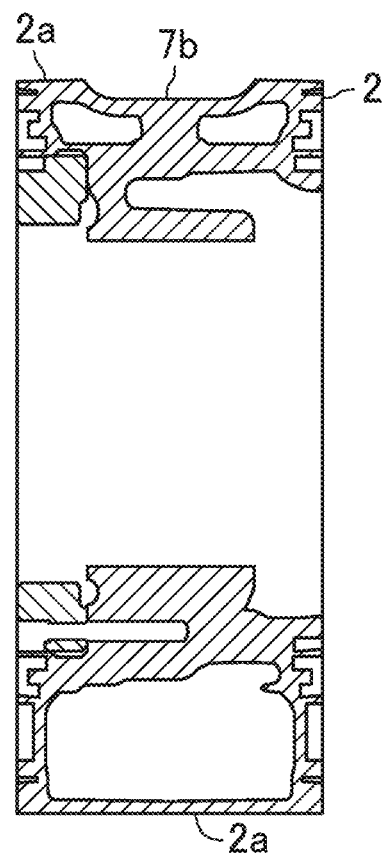
FIG. 6 is a cross-sectional view taken along line VI-VI of FIG. 3.

As shown in FIGS. 4 to 6, the L-side area 7a includes a depth 15, which is recessed to be deepest at the center corresponding to the ignition point of the L-side spark plug 91. The depth 15 is deeper than the T-side area 7b. The depth 15 has a concave surface curving with a depth gradually decreasing toward both the sides of the outer circumferential surface 2a of the rotor 2 and toward the front in the rotation direction of the rotor. The depth 15 has a width W1 larger than a width W2 of the T-side area 7b, and larger than the diameter of a hemispherical bulge of a virtual flame, which will be described later. The depth 15 has a larger radius of curvature than the hemispherical bulge thereof.

Figure 7:
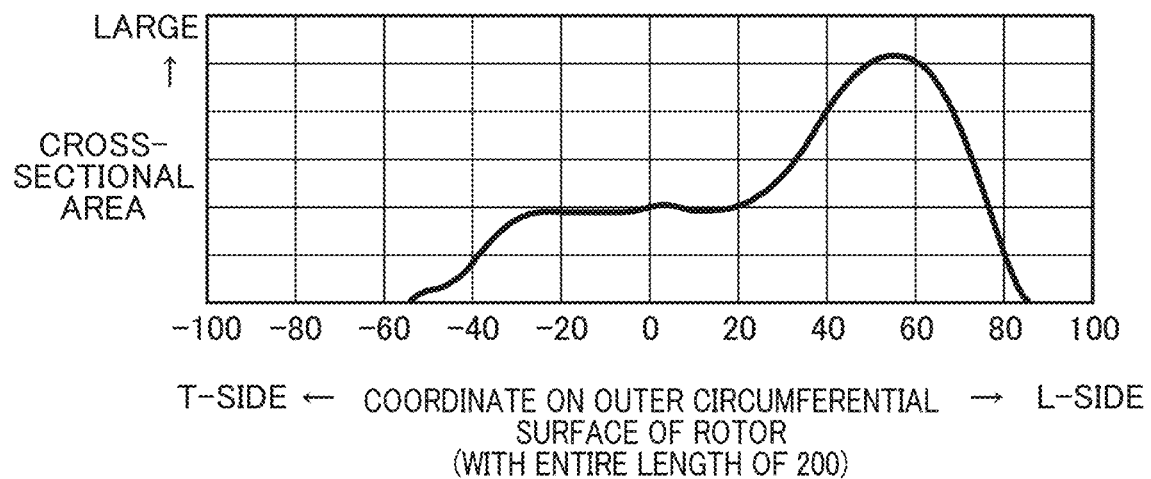
FIG. 7 is a graph illustrating cross-sectional areas of a recess in positions of the outer circumferential surface of the rotor.

FIG. 7 illustrates a change in the cross-sectional area, which is perpendicular to the rotation direction of the rotor, of each recess 7 along the length of the associated one of the outer circumferential surfaces 2a of the rotors 2.

The L-side area 7a has a small cross-sectional area that is substantially constant, as viewed forward in the rotation direction of the rotor, from the longitudinal center of the outer circumferential surface 2a to the area around 20/100 of the entire leading-side length. The entire leading-side length extends from the longitudinal center of the outer circumferential surface 2a to the front end. After reaching the area around 20/100, the cross-sectional area gradually increases. After reaching the area around 50/100 of the entire leading-side length, the cross-sectional area becomes the largest, and then gradually decreases. The T-side area 7b has a cross-sectional area that is substantially the same as the small cross-sectional area of the L-side area 7a, as viewed rearward in the rotation direction of the rotor, from the longitudinal center of the outer circumferential surface 2a to the area around 20/100 or 30/100 of the entire trailing-side length. The entire trailing-side length extends from the longitudinal center of the outer circumferential surface 2a to the rear end. After reaching the area around 20/100 or 30/100, the cross-sectional area gradually decreases.

The L-side area 7a has the following cross-sectional area in one preferred embodiment. The cross-sectional area starts increasing at a point within a range from 15/100 to 30/100 of the entire leading-side length from the longitudinal center of the outer circumferential surface 2a. The cross-sectional area is the largest at a point within a range from 50/100 to 70/100 of the entire leading-side length. This is to provide a low S/V ratio at 49° BTDC.

As is apparent from the above description, a volume V1 of the L-side area 7a is larger than a volume V2 of the T-side area 7b. The volume ratio V1/V2 falls within a range from 60/40 to 80/20 in one preferred embodiment.

<Virtual Flame and S/V Ratio>

Figure 8:
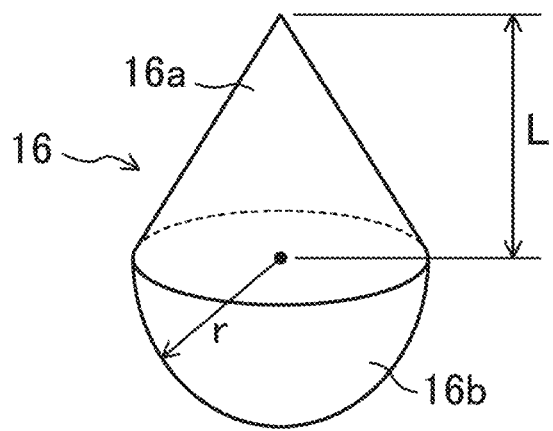
FIG. 8 is a perspective view of a virtual flame.

The L-side sparkplug 91 ignites air-fuel mixture before the compression top dead center. While a flame radially propagates from the ignition point, the center of the flame moves in the rotation direction of the rotor due to a squish flow from the trailing side to the leading side caused by a change in the volume of the operation chamber 8. An ideal shape of the flame generated in this case is as follows on the assumption that neither the rotor 2 nor the rotor housing 3 interferes with the flame. As shown in FIG. 8, the flame conically expands from the ignition point in the moving direction. The tip surface of the flame hemispheric ally bulges. That is, the flame has an integrated shape of a cone 16a and a hemispherical bulge 16b, where the center of the flame moves at a distance L, and the flame propagates at distance r from the center of the flame. Then, the cone 16a has a bottom with a diameter of 2×r, and a height of L, while the hemispherical bulge 16b has a radius r.

A virtual flame 16, as here defined, is generated when the L-side spark plug 91 ignites air-fuel mixture before the compression top dead center. Specifically, the virtual flame 16 includes the cone 16a with a length L of 17.5 mm, and the hemispherical bulge 16b with a radius r of 12.5 mm. The volume of the virtual flame 16 is the sum of the volume of the cone 16a ($\frac{1}{3} \times \pi r^2 \times L$) and the volume of the hemispherical bulge 16b ($\frac{2}{3} \times \pi r^3$). This virtual flame is assumed to be formed at the start time of the apparent heat generation.

Figure 9:
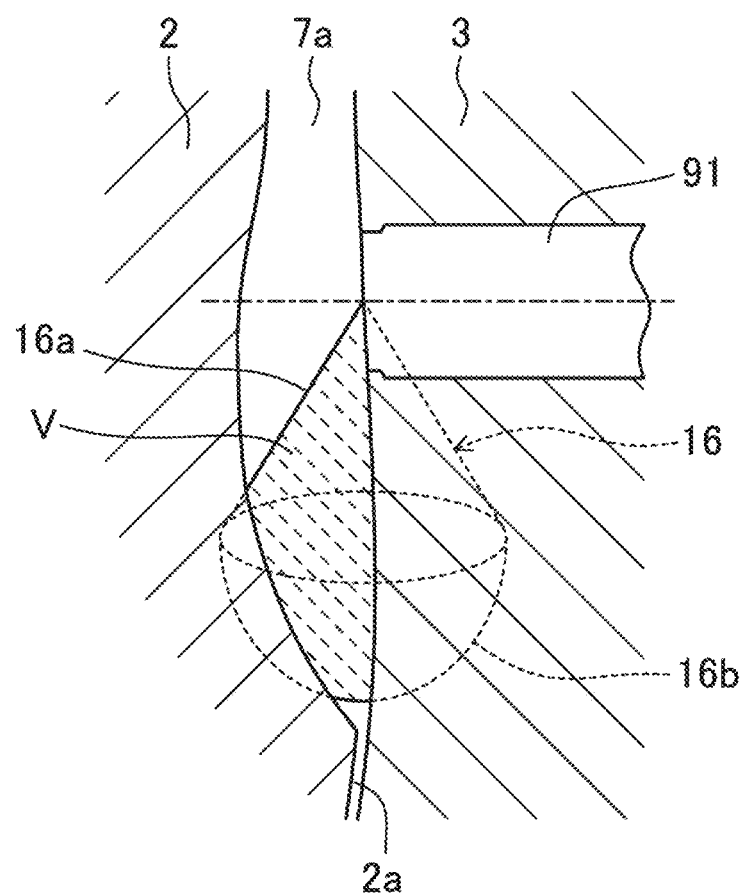
FIG. 9 is a cross-sectional view illustrating how the rotor and the rotor housing interfere with the virtual flame at 49° BTDC.

Now, one preferred embodiment of each of the recesses 7 in the outer circumferential surfaces 2a of the rotors 2 will be described based on the geometric interference of the rotor 2 and the rotor housing 3 with the virtual flame 16 at 49° BTDC shown in FIG. 9.

The rotor 2 and the rotor housing 3 geometrically interfere with the virtual flame 16 at 49° BTDC. The part (hatched with broken lines in FIG. 9) of the virtual flame 16, which is not interfered with by the rotor 2 or the rotor housing 3, has a volume V ($mm^3$) (hereinafter referred to as a "non-interference volume"). The total area of the surfaces on which the virtual flame 16 is in contact with the rotor 2 and the rotor housing 3 is S ($mm^2$). That is, the total area is the sum of the contact areas between the part with the non-interference volume V and the rotor 2 and between the non-interference volume V and the rotor housing 3 (hereinafter referred to as a "contact area").

The non-interference volume V of the virtual flame 16 is deprived of heat from the surfaces (the parts of the contact area S), which are in contact with the rotor 2 and the rotor housing 3, by the rotor 2 and the rotor housing 3. This is a cooling loss. In this case, with an increase in the contact area S relative to the non-interference volume V, the cooling loss also increases.

Therefore, definition of the S/V ratio, which is the ratio of the contact area S to the non-interference volume V, allows for estimate of the degree of the cooling loss at the initial stage of combustion of the rotary piston engine based on the virtual flame 16. The S/V ratio is 0.45 or lower in one preferred embodiment. The S/V ratio of 0.45 or lower means a small cooling loss from the flame at the initial stage of combustion.

Figure 10:
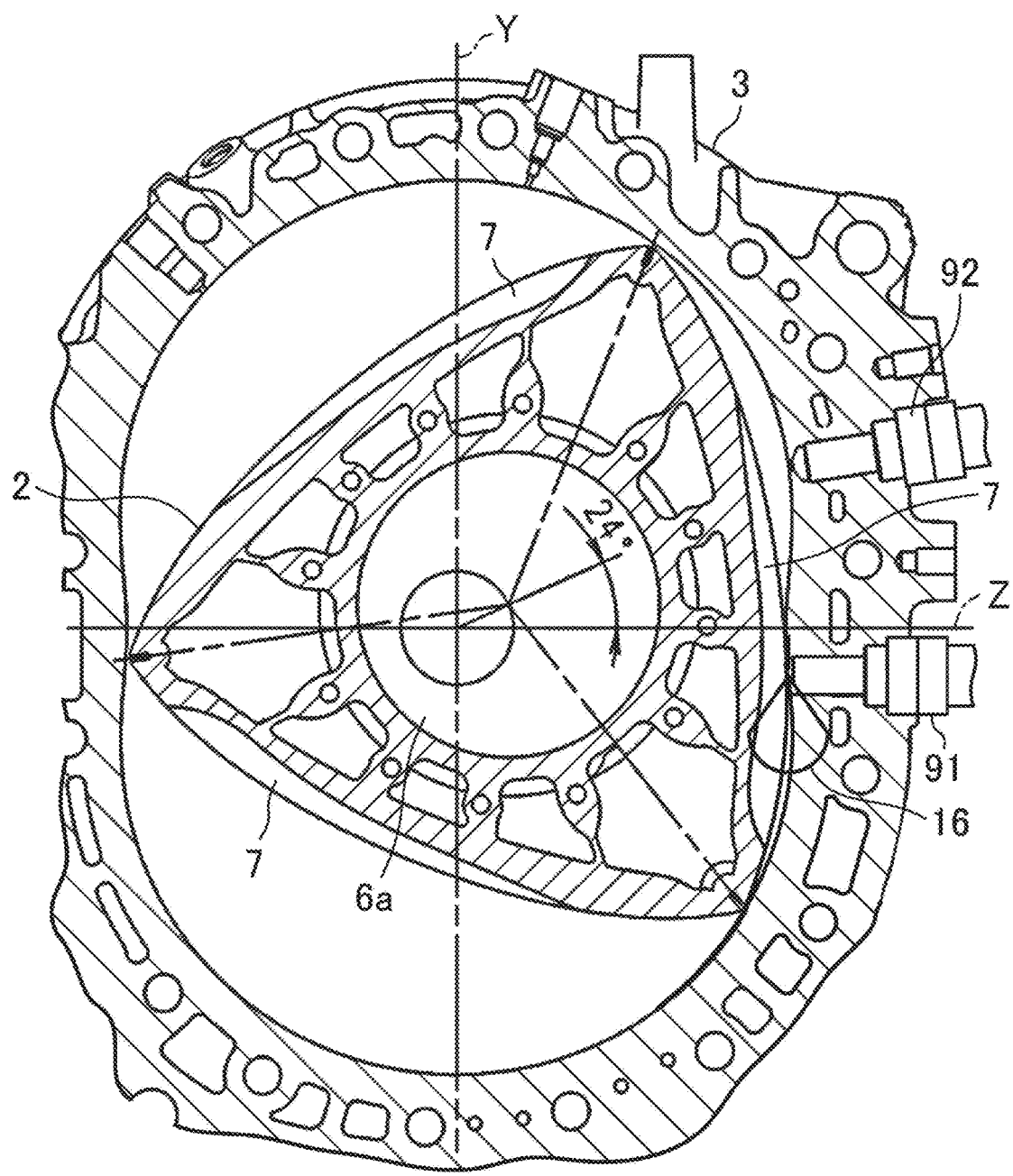
FIG. 10 is a cross-sectional view illustrating the rotor, the rotor housing, and the virtual flame at 24° BTDC.

FIG. 10 illustrates the rotor 2 at 24° BTDC. In the L-side area 7a, the virtual flame 16 extends forward in the rotation direction of the rotor. As is apparent from the figure, the following is advantageous in reducing the cooling loss. The depth 15 described above is formed in a forward position of the L-side area 7a to increase the cross-sectional area of the depth 15, thereby reducing the interference between the flame and the rotor 2.

With an increase in the L-side area 7a, the rotor 2 interferes less with the virtual flame 16. However, the interference of the rotor housing 3 is still unchanged. Specifically, the rotor housing 3 interferes with a half of the virtual flame 16 when the virtual flame 16 is divided by the vertical section passing through the axis of the conical expansion. When the L-side area 7a expands and the rotor 2 does not interfere with the virtual flame 16, the non-interference volume V of the virtual flame 16 is about a half of the total volume of the virtual flame 16. Therefore, $V = \frac{1}{2} \times (\frac{1}{3} \times \pi r^2 \times L + \frac{2}{3} \times \pi r^3)$ holds. The contact area S of the virtual flame 16 with the rotor housing 3 is $S = r \times L + (\frac{1}{2}) \pi r^2$. In view of the foregoing, the lower limit of the S/V ratio is about 0.13 in one preferred embodiment.

Examples and Comparative Examples

Figure 11:
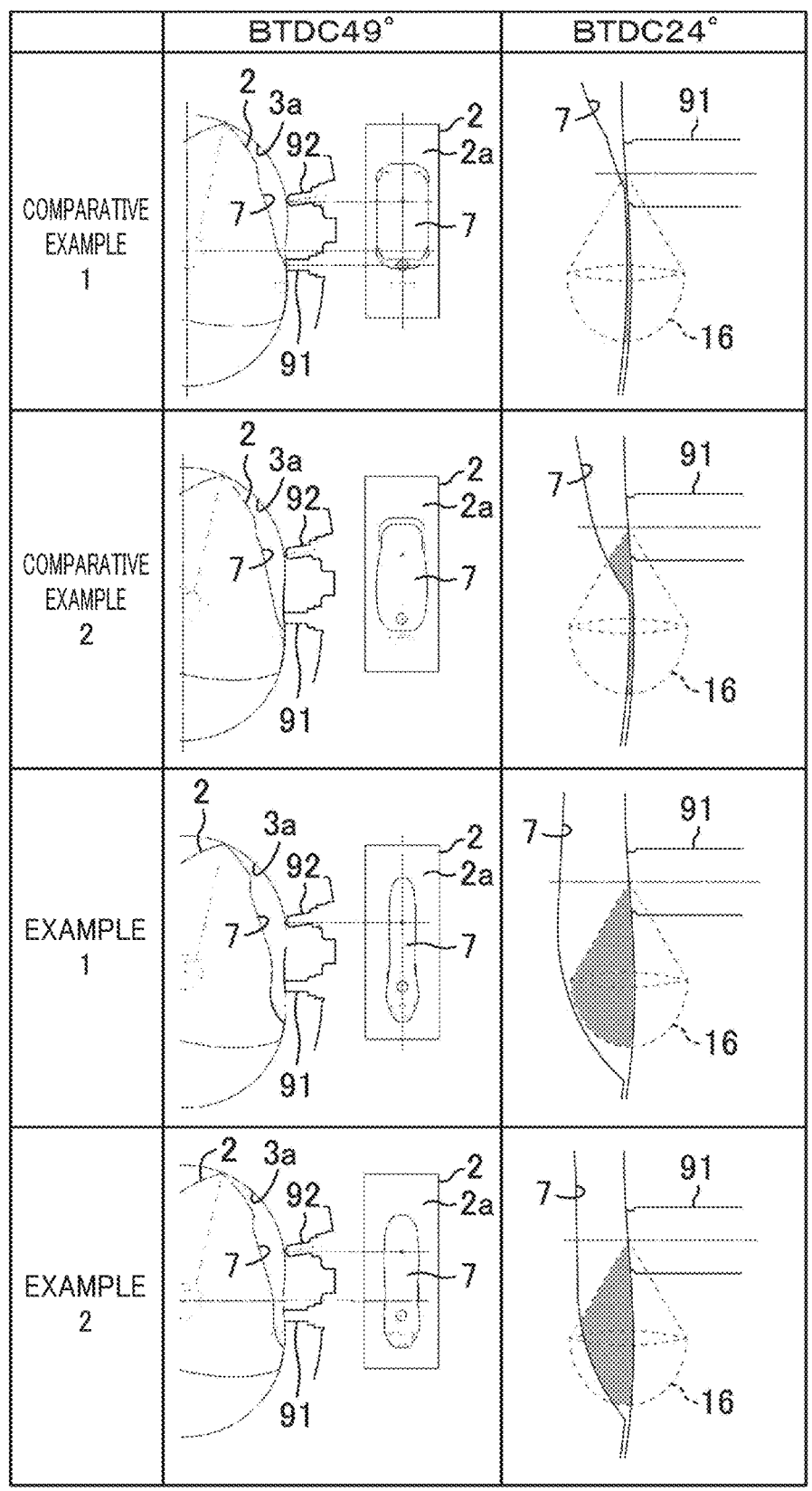
FIG. 11 illustrates the shape of a recess and how a rotor and a rotor housing interfere with a virtual flame in each of Comparative Examples 1 and 2 and Embodiments 1 and 2.
Figure 12:
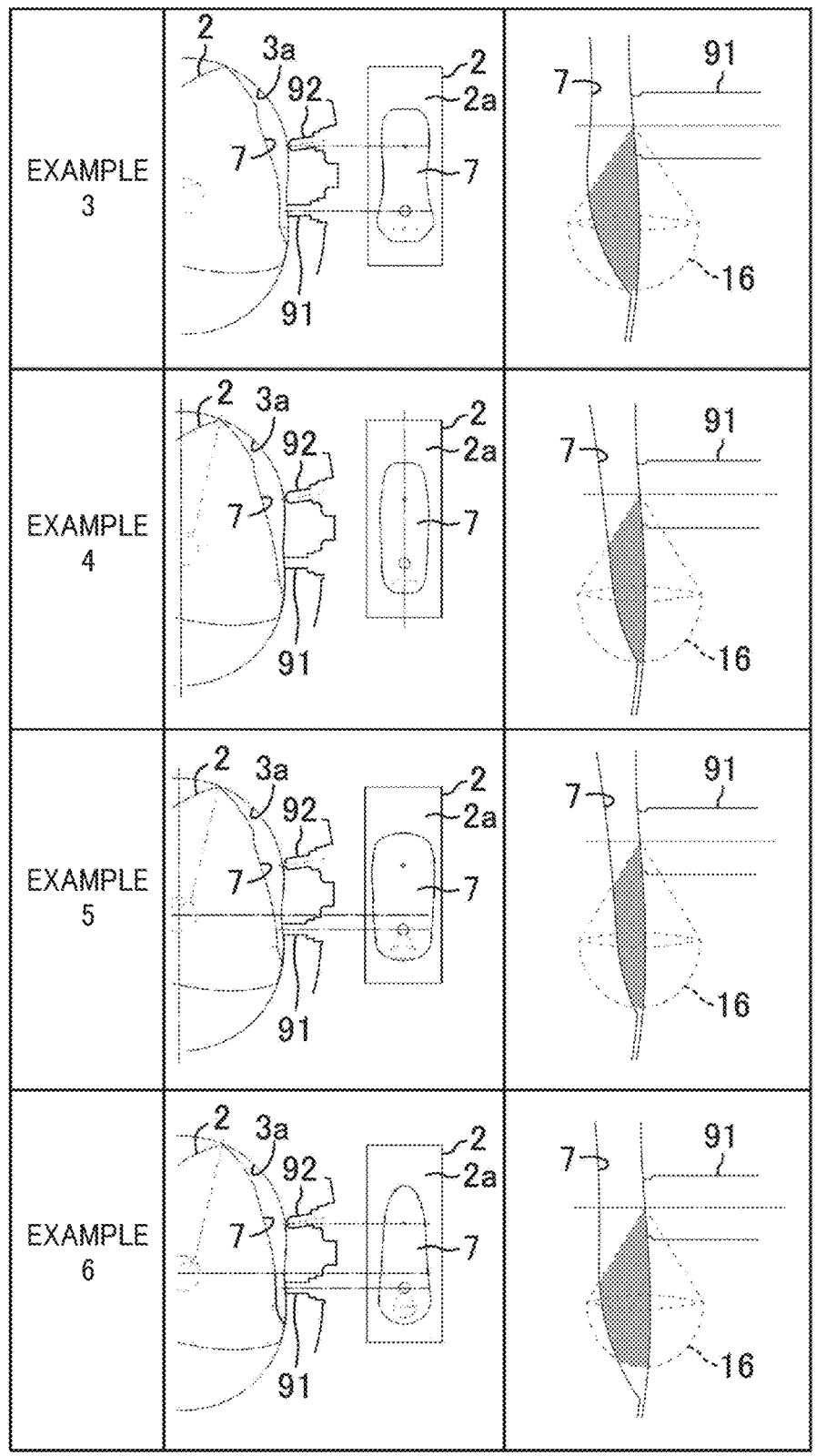
FIG. 12 illustrates a shape of a recess and how a rotor and a rotor housing interfere with a virtual flame in each of Embodiments 3 to 6.

As shown in FIGS. 11 and 12, rotors according to Examples 1 to 6 and Comparative Examples 1 and 2 having recesses with difference configurations were prepared. In FIGS. 11 and 12, each of the left views of Examples 1 to 6 and Comparative Examples 1 and 2 illustrates the relationship between the rotor 2 and the spark plugs 91 and 92 at 49° BTDC. On the right, enlarged views around the respective L-side spark plugs 91 are found, each of which illustrates the relationship between the operation chamber 8 and the virtual flame 16. In each left view, a white circle and a black dot in the recess 7 shown on the right represent the positions of the L-side spark plug 91 and the T-side spark plug 91, respectively. The volumes of the recesses, the S/V ratios, and other values according to Examples 1 to 7 and Comparative Examples 1 and 2 are shown in Table 1.

a result, the rotor interferes less with the virtual flame, which decreases the S/V ratio. However, since the L-side area has no depth, this example exhibits a higher S/V ratio than that of Example 1. V1/V2 is 64/36. The recess has a slightly larger total volume than that of Comparative Example 1.

TABLE 1

| | Volume of Recess (mm³) | | | | | | | | | | |
|---|---|---|---|---|---|---|---|---|---|---|---|
| | V1 of L-Side Recess | V2 of T-Side Recess | Volume Ratio (V1/V2) | Total Volume of Recess | Ld/Lo | Total Volume Vt at 49° BTDC (mm³) | Compression Ratio ε | Volume V (mm³) | Surface Area S (mm³) | S/V | V/Vt |
| Comparative Example 1 | 13400 | 13400 | 50/50 | 26800 | 22/100 | 151600 | 10.78 | 383 | 924 | 2.4126 | 0.0025 |
| Comparative Example 2 | 17400 | 9800 | 64/36 | 27200 | 18/100 | 152000 | 10.73 | 592 | 911 | 1.5388 | 0.0039 |
| Example 1 | 18800 | 10000 | 65/35 | 28800 | 9/100 | 153600 | 10.55 | 3981 | 519 | 0.1304 | 0.0259 |
| Example 2 | 18200 | 10200 | 64/36 | 28400 | 10/100 | 153200 | 10.60 | 3375 | 765 | 0.2268 | 0.0220 |
| Example 3 | 18700 | 10100 | 65/35 | 28700 | 12/100 | 153500 | 10.56 | 2974 | 779 | 0.2620 | 0.0194 |
| Example 4 | 18400 | 10200 | 64/36 | 28600 | 12/100 | 153400 | 10.57 | 2309 | 845 | 0.3659 | 0.0151 |
| Example 5 | 17900 | 10500 | 63/37 | 28400 | 11/100 | 153200 | 10.60 | 2153 | 859 | 0.3987 | 0.0141 |
| Example 6 | 21000 | 5700 | 79/21 | 26800 | 9/100 | 151600 | 10.78 | 3484 | 710 | 0.2037 | 0.0230 |
| Example 7 | 25900 | 7200 | 78/22 | 33100 | 10/100 | 157900 | 9.70 | 3584 | 610 | 0.1702 | 0.0227 |

In Comparative Example 1, a dish-shaped rectangular recess 7 with a substantially constant depth is formed in the outer circumferential surface of the rotor 2. The volume ratio V1/V2 of the L-side area to the T-side area is 50/50. In Comparative Example 1, since the distal end of the L-side area is located near the L-side spark plug 91, the rotor 2 interferes more with the virtual flame 16. This results in a high S/V ratio.

In Comparative Example 2, as compared to Comparative Example 1, the recess 7 is, as a whole, shifted forward in the rotation direction of the rotor. The distal end of the L-side area slightly expands forward in the rotation direction of the rotor. V1/V2 is 64/36. The total volume of the recess is slightly larger. In Comparative Example 2, the distal end of the L-side area bulges forward in small degree in the rotation direction of the rotor. This results in a high S/V ratio, as in Comparative Example 1.

In Example 1, as compared to Comparative Example 1, the recess 7 is elongate such that the distal end of the L-side area extends forward in the rotation direction of the rotor, and the depth is formed in a forward position of the L-side area. As a result, the rotor interferes less with the virtual flame, which decreases the S/V ratio. V1/V2 is 65/35. The recess has a slightly larger total volume than that of Comparative Example 1.

In Example 2, as compared to Comparative Example 1, the recess 7 is elongate such that the distal end of the L-side area extends forward in the rotation direction of the rotor, and the recess is deep as a whole. As a result, the rotor interferences less with the virtual flame, which decreases the S/V ratio. V1/V2 is 64/36. The recess has a slightly larger total volume than that of Comparative Example 1.

In Example 3, as compared to Comparative Example 1, the T-side area is narrow and the distal end of the L-side area extends forward in the rotation direction of the rotor, and the depth is formed in a forward position of the L-side area. As a result, the rotor interferes less with the virtual flame, which decreases the S/V ratio. V1/V2 is 65/35. The recess has a slightly larger total volume than that of Comparative Example 1.

In Example 4, as compared to Comparative Example 1, the recess 7 is elongate such that the distal end of the L-side area extends forward in the rotation direction of the rotor. As In Example 5, as compared to Comparative Example 1, the recess 7 is shifted forward in the rotation direction of the rotor. In addition, the distal end of the L-side area extends forward in the rotation direction of the rotor. As a result, the rotor interferes less with the virtual flame, which decreases the S/V ratio. However, since the L-side area has no depth, this example exhibits a higher S/V ratio than that of Example 1. V1/V2 is 63/37. The recess has a slightly larger total volume than that of Comparative Example 1.

In Example 6, the recess 7 has a width gradually increasing forward in the rotation direction of the rotor. The distal end of the L-side area extends forward in the rotation direction of the rotor. The depth is formed in a forward position of the L-side area. The L-side area is deeper than that of Comparative Example 1. As a result, the rotor interferes less with the virtual flame, which decreases the S/V ratio. The recess has the same total volume as in Comparative Example 1. However, V1/V2 is 79/21. This example exhibits a higher compression ratio than that of Comparative Example 1.

Example 7 is shown in FIGS. 3 to 7, 9, and 10. The L-side area 7a expands forward in the rotation direction of the rotor like a bulb. The depth is formed in the L-side area. Accordingly, the rotor interferes less with the virtual flame, which decreases the S/V ratio. V1/V2 is 78/22.

Figure 13:
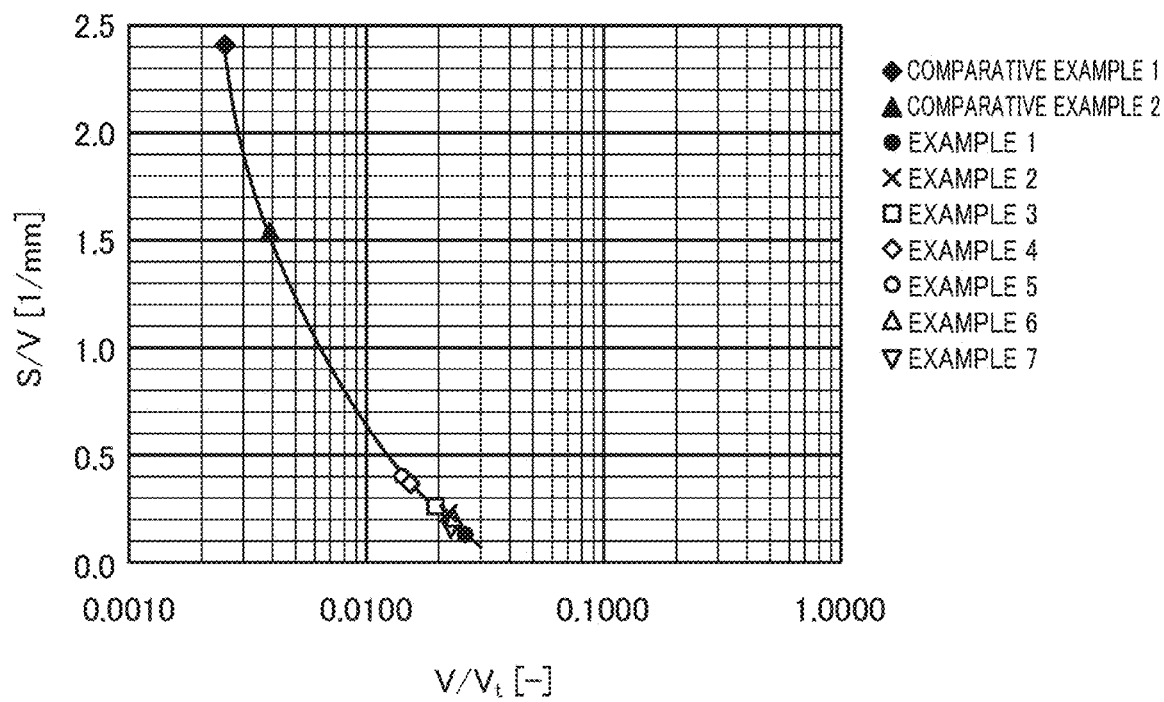
FIG. 13 is a graph illustrating the relationship between an S/V ratio and a V/Vt ratio.

In Table 1, the total volume Vt is a volume of the operation chamber including the recess of the rotor at 49° BTDC. The V/Vt ratio is a ratio of the non-interference volume V of the virtual flame 16 to the volume Vt of the operation chamber. As it were, the V/Vt ratio represents the potential flame growth. The higher the V/Vt ratio, the more easily the flame grows, which will be advantageous in shortening the periods of ignition delay and the combustion. With an increase in the non-interference volume V, it becomes difficult to obtain a compression ratio of 9.7 or more. The V/Vt ratio falls thus within a range from 0.014 to 0.026 in one preferred embodiment. FIG. 13 is a graph illustrating the relationship between the S/V ratio and the V/Vt ratio.

Figure 14:
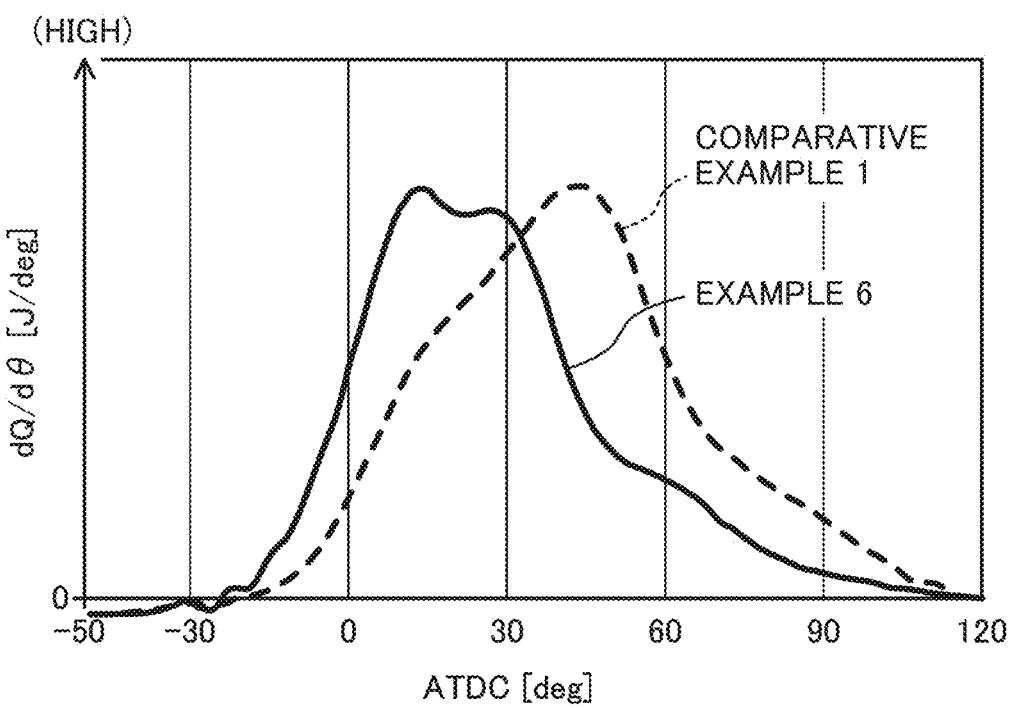
FIG. 14 is a graph illustrating rates of heat generation in Comparative Example 1 and Embodiment 7.

For each of Comparative Example 1 and Example 6, heat generating characteristics were evaluated at an engine speed of 1500 rpm, a shaft output of 294 kPa, and an EGR ratio of 30%. As shown in FIG. 14, Example 6 with a lower S/V ratio allows the ignition timing of the L-side spark plug 91 to advance to −49° ATDC (−40° ATDC for the L-side spark plug 91 in Comparative Example 1). The start time of the apparent heat generation was around −24° ATDC. It was confirmed that the combustion time shortened and the combustion center of gravity advanced to improve the thermal efficiency. The ignition timing of the T-side spark plug 92 in each of Comparative Example 1 and Example 6 was at −17° ATDC.

Figure 15:
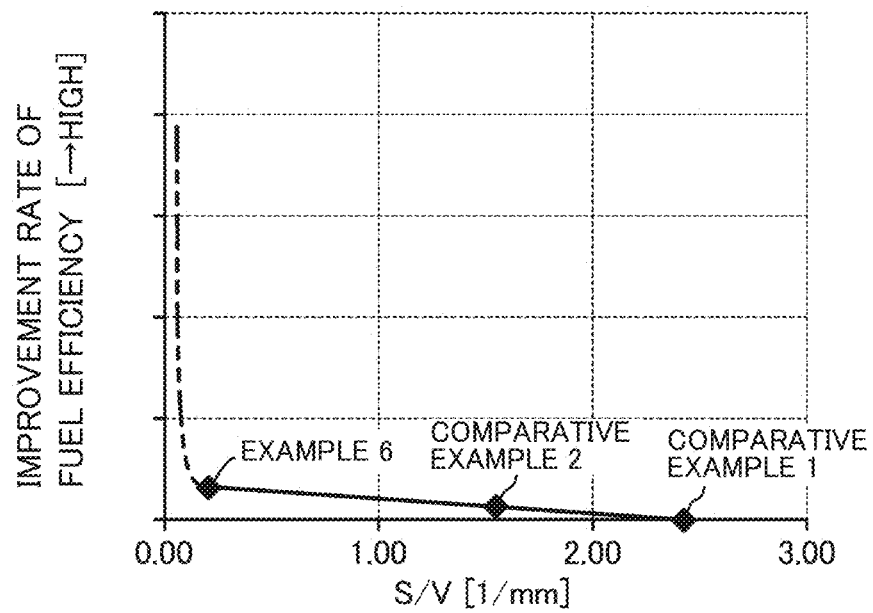
FIG. 15 is a graph illustrating the relationship between the S/V ratio and an improvement rate of fuel efficiency.
Figure 16:
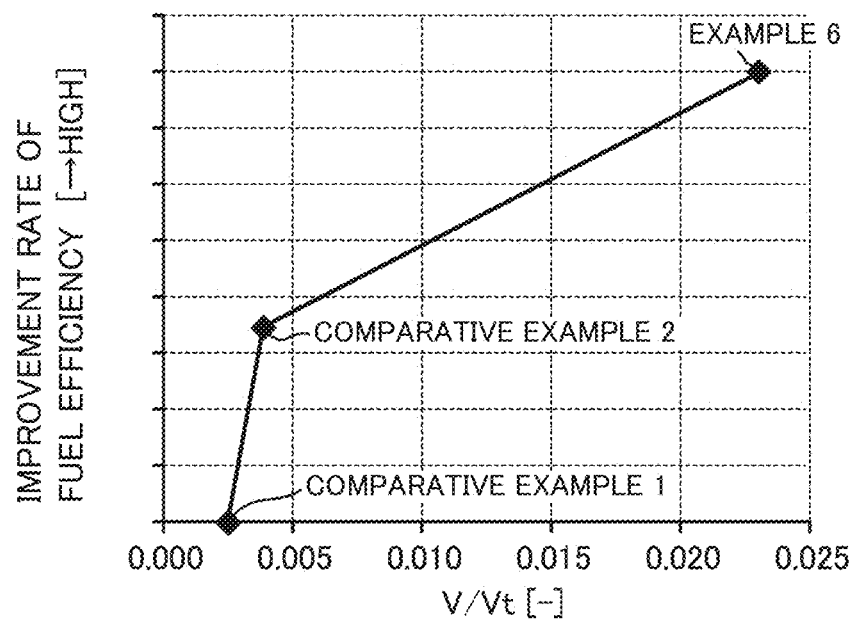
FIG. 16 is a graph illustrating the relationship between the V/Vt ratio and the improvement rate of fuel efficiency.

For each of Comparative Examples 1 and 2, and Example 6, the fuel efficiency was measured at an engine speed of 1500 rpm, a shaft output of 294 kPa, and an EGR rate of 30%. The results were summarized in the relationships between the S/V ratio and the improvement rate of fuel efficiency and between the V/Vt ratio and the improvement rate of fuel efficiency. The improvement rate of fuel efficiency was calculated based on Comparative Example 1. The relationship between the S/V ratio and the improvement rate of fuel efficiency is shown in FIG. 15. The relationship between the V/Vt ratio and the improvement rate of fuel efficiency is shown in FIG. 16.

It is apparent from FIG. 15 that the fuel efficiency improves with a decrease in the S/V ratio. It is apparent from FIG. 16 that the fuel efficiency improves with an increase in the V/Vt.

What is claimed is:

1. A rotary piston engine, comprising:
   a rotor housing with a trochoid inner circumferential surface, the surface being in a substantially elliptical shape;
   side housings, each being disposed on either side of the rotor housing along an axis of the rotor housing, and forming a rotor housing chamber together with the rotor housing;
   a substantially triangular rotor housed in the rotor housing chamber, having three outer circumferential surfaces that partition the rotor housing chamber into three operation chambers, having recesses, each being formed in one of the outer circumferential surfaces, and allowing the operation chambers to sequentially perform intake, compression, expansion and exhaust strokes while circumferentially moving the operation chambers by rotation; and
   a spark plug provided in the rotor housing; wherein
   each of the recesses includes: a leading-side area extending forward from a longitudinal center of an associated one of the outer circumferential surfaces in a rotation direction of the rotor; and a trailing-side area continuous with the leading-side area, and extending rearward from the longitudinal center in the rotation direction,
   each of the recesses extends long in the rotation direction,
   from the longitudinal center in the rotation direction, forward extension of the leading-side area is longer than rearward extension of the trailing-side area,
   the leading-side area has a width gently increasing toward a front in the rotation direction of the rotor, and a continuous arc-like distal most end projecting forward in the rotation direction,
   the trailing-side area is continuous with a narrowed proximal end of the leading-side area, extends, with a same width as the proximal end, rearward in the rotation direction of the rotor, and has a tapered distal end and a distal edge that extends linearly along a width of the rotor,
   a distance between the distal most end of the leading-side area in the rotation direction of the rotor and a tip of the associated one of the outer circumferential surfaces in the rotation direction falls within a range from 5/100 to 15/100 of a length of the outer circumferential surface in the rotation direction,
   the leading-side area has a larger volume than the trailing-side area, and
   the leading-side area includes a depth recessed to be deepest at a center corresponding to an ignition point of the spark plug.

2. The rotary piston engine according to claim 1, wherein the leading-side area is in a shape expanding forward in the rotation direction of the rotor like a bulb.

\* \* \* \* \*